No. 683,024. Patented Sept. 24, 1901.
J. DUNN.
MEANS FOR PACKING LEAKS IN PIPES.
(Application filed Feb. 23, 1901.)
(No Model.)

Witnesses.
G. A. Paukerschmitt.
Louis J. Dixon.

Inventor
Joseph Dunn
By Charles U. Hill
Atty.

THE NORRIS PETERS CO., PHOTO-LITHO., WASHINGTON, D. C.

UNITED STATES PATENT OFFICE.

JOSEPH DUNN, OF CHICAGO, ILLINOIS.

MEANS FOR PACKING LEAKS IN PIPES.

SPECIFICATION forming part of Letters Patent No. 683,024, dated September 24, 1901.

Application filed February 23, 1901. Serial No. 48,633. (No model.)

*To all whom it may concern:*

Be it known that I, JOSEPH DUNN, a citizen of the United States, and a resident of Chicago, in the county of Cook and State of Illinois, have invented certain new and useful Improvements in Means for Packing Leaks in Pipes; and I do hereby declare that the following is a full, clear, and exact description thereof, reference being had to the accompanying drawings, and to the letters of reference marked thereon, which form a part of this specification.

This invention relates to means for packing leaks in pipes, and more particularly to adjustable means designed to be secured on the pipe and acting to force into the leak a packing-ring of any desired material.

Heretofore where pipes are connected in returns, elbows, T's, or other fittings it has been difficult should a leak occur to pack the joint without disconnecting the pipe and reuniting the same. This is frequently inconvenient, if not impossible, owing to the service such pipes must sustain.

The object of my invention is to provide cheap, simple, and readily-operated means by which the leak may be quickly and surely stopped without repacking.

The invention consists of the matters hereinafter described, and more fully pointed out and defined in the appended claims.

Figure 1:
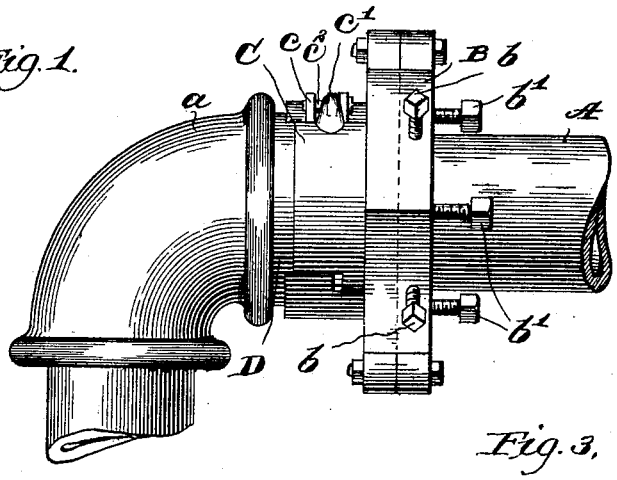
Figures 2, 3:
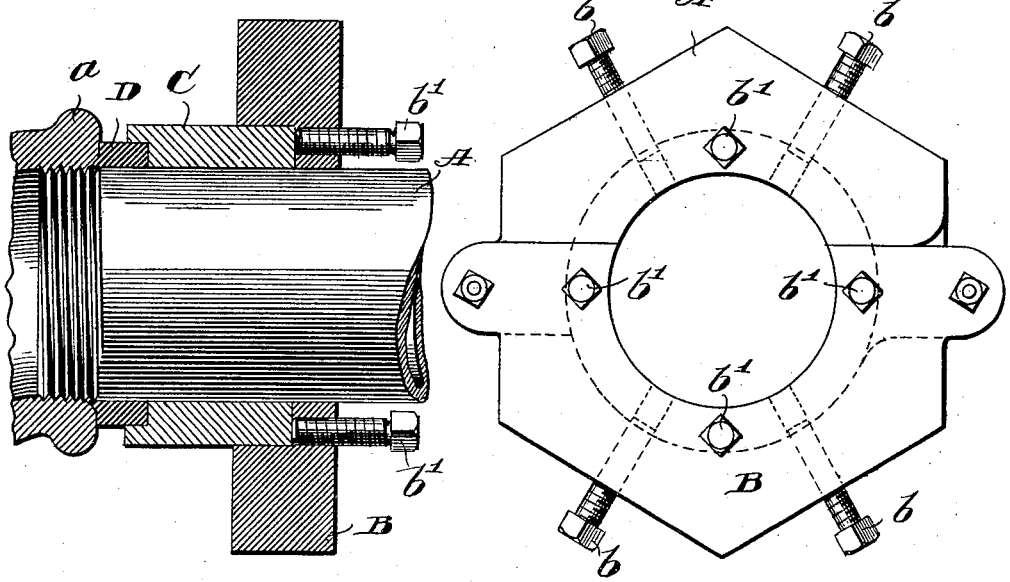
Figure 4:
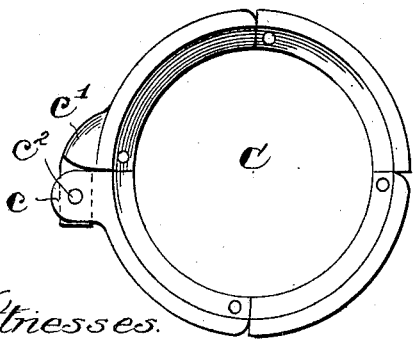
Figure 5:
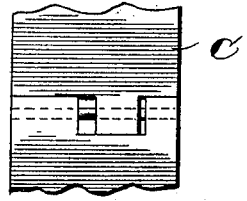

In the drawings, Figure 1 is a side elevation of a device embodying my invention, showing the same in use. Fig. 2 is a view showing the device in longitudinal section. Fig. 3 is a front elevation of the clamps. Fig. 4 is an elevation of the compressing-ring. Fig. 5 is a detail of the same.

In the drawings, A indicates a pipe of any desired size connected in an elbow $a$ in a familiar manner.

B indicates a two-part annular metallic clamp hinged diametrically and provided with a central aperture of a size sufficient to receive the pipe. Said hinge may be conveniently formed by providing lugs on the opposite sides of each half of said clamp, halving the same together, and passing a bolt or pin therethrough. $b\ b$ indicate set-screws having screw-threaded engagement in and passing radially through said clamp in position to engage a pipe on which said clamp is secured. As shown, four of such set-screws are arranged about the periphery of said clamp at equal distances apart. Said clamp is provided on its inner side with a rabbet concentric with and opening into said central aperture, as indicated in Fig. 2, and into which fits the end of the compressing-ring C, as shown in Figs. 1 and 2. The outer end of said compressing-ring is provided with a groove or rabbet concentric therewith adapted to receive the packing-ring D and jam the same into the joint. $b'\ b'$ indicate set-screws having screw-threaded engagement in said clamp, parallel with the axis of the aperture, the inner ends of which engage the inner ends of the compressing-ring C and act to force the parts thereof longitudinally of the pipe against and onto the packing-ring D. Said ring C is constructed, as shown, in four sections, hinged together by means affording longitudinal movement of each section thereof with respect to the other, as shown in Fig. 5. This is secured by providing on the meeting ends of said sections complemental tenons and sockets, said tenons, however, being materially narrower than the width of the sockets, so as to permit considerable end play in said hinges. A pivot-pin passes through the end of each section and the tenon therein, as shown in Figs. 4 and 5, and the edge of one or both of said meeting ends is rounded over on the outer side to permit the sections to fold back one upon the other to permit the pipe to be received therein. If preferred, two of said meeting ends may be provided with complemental lugs $c\ c'$, of which two, $c\ c$, are on one section and one, $c'$, on the other, which passes between the lugs $c\ c$ and is secured thereto by a pin $c^2$, which passes through the ends of said lugs.

The operation of my device is as follows: It being desired to close a leak at the point where the pipe A joins with the fitting $a$, the compressible packing-ring D is placed in position on said pipe. The compressing-ring C is secured thereon, with the grooved or rabbeted end of the same in engagement with the compressible packing D. The clamp B is next placed in position, with the rabbet or groove therein engaging the end of the compressing-ring C, and is rigidly secured in said position by means of the set-screws $b\ b$, which are turned inwardly into positive engagement with the pipe. The set-screws $b'$ $b'$ are next set up in engagement with the respective section of the ring C, thereby forcing the same longitudinally on the pipe in the direction of the fitting $a$ and compressing the ring D into the joint, as indicated in Fig. 2, thereby effectually closing the leak. A material advantage is gained by providing sufficient longitudinal movement of each of the sections of the ring C with respect to the adjacent sections to prevent said ring binding on the pipe through the pressure on the set-screws $b'$, it being obvious that the ring as herein shown may be set up one section at a time to the desired extent and follow with the remaining sections without binding or jamming the pipe. Obviously should a leak occur in the pipe at any other place than adjacent to the joint the same may readily be closed by using two of the clamps B, one on each side of the packing-ring D, which should cover the leak, and also one of the compressing-rings C on each side of the same, whereupon the rings C may be forced toward each other upon the packing-ring by means of said clamps, thereby effectually closing the leak.

Obviously many details of construction may be varied without departing from the principle of my invention.

I claim as my invention—

1. In a device of the class described, the combination with a packing-ring, of a compressing-ring engaging over the same, said compressing-ring comprising a plurality of sections each of which is longitudinally movable with respect to the other and a clamp adapted to be rigidly secured on the pipe to which the packing is to be applied and acting to force the compressing-ring onto the packing-ring.

2. In a device of the class described, the combination with an annular packing-ring, of a two-part clamp, radial set-screws thereon adapted to positively engage a pipe, a plurality of set-screws parallel to the axis of the clamp the inner ends of which extend within an annular rabbet, compressing-rings comprising a plurality of sections each movable longitudinally of the other and rabbeted at one end of the same to engage the packing-ring the other end of the same being adapted to engage in the rabbet of the clamp in position to be engaged by said set-screws.

3. In a slip-joint for pipes, a clamp adapted to be rigidly secured on the pipe, an annular compressible packing-ring adapted to be secured on the pipe at a leak, a compressing-ring composed of sections each longitudinally movable with respect to the others and having an end recess to engage the packing-ring and a plurality of set-screws carried on said clamp and acting to force the compressing-ring onto the packing.

In testimony whereof I have hereunto subscribed my name in the presence of two subscribing witnesses.

JOSEPH DUNN.

Witnesses:
C. W. HILLS,
LOUIS J. DELSON.